(12) United States Patent
Maillon et al.

(10) Patent No.: US 12,247,680 B2
(45) Date of Patent: Mar. 11, 2025

(54) METAL TUBULAR CONNECTING PART AND METHOD FOR OBTAINING SUCH A PART BY ADDITIVE MANUFACTURING

(71) Applicant: VALLOUREC OIL AND GAS FRANCE, Aulnoye-Aymeries (FR)

(72) Inventors: Bertrand Maillon, Meudon (FR); Alexandre Noel, Meudon (FR); Thierry Taisne, Meudon (FR); Umberto Caruso, Meudon (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 109 days.

(21) Appl. No.: 18/247,297

(22) PCT Filed: Sep. 24, 2021

(86) PCT No.: PCT/EP2021/076352
§ 371 (c)(1),
(2) Date: Mar. 30, 2023

(87) PCT Pub. No.: WO2022/069366
PCT Pub. Date: Apr. 7, 2022

(65) Prior Publication Data
US 2023/0408003 A1   Dec. 21, 2023

(30) Foreign Application Priority Data
Oct. 1, 2020 (FR) ........................ 2010068

(51) Int. Cl.
*F16L 15/00* (2006.01)
*B33Y 80/00* (2015.01)
*F16L 25/14* (2006.01)

(52) U.S. Cl.
CPC .......... *F16L 15/006* (2013.01); *B33Y 80/00* (2014.12); *F16L 15/007* (2013.01); *F16L 25/14* (2013.01)

(58) Field of Classification Search
CPC ........ F16L 25/14; F16L 15/006; E21B 17/042
See application file for complete search history.

(56) References Cited

U.S. PATENT DOCUMENTS 2,147,254 A * 2/1939 Hinderliter ........... E21B 17/042
4,266,813 A * 5/1981 Oliver .................... F16L 25/14
(Continued)

FOREIGN PATENT DOCUMENTS

| CN | 106869813 A | 6/2017 | |
| CN | 111594675 A * | 8/2020 | ............. F16L 25/14 |
| WO | WO 2019/016254 A1 | 1/2019 | |

OTHER PUBLICATIONS

International Search Report issued Nov. 19, 2021 in PCT/EP2021/076352, filed on Sep. 24, 2021, 2 pages.

*Primary Examiner* — Zachary T Dragicevich
(74) *Attorney, Agent, or Firm* — Oblon, McClelland, Maier & Neustadt, L.L.P.

(57) ABSTRACT

A metal tubular connecting part includes a total axial length, an inner surface, and an outer surface. The inner and outer surfaces delimit a wall, an outer transition surface, and an inner transition surface. The outer transition surface and the inner transition surface delimit a transition thickness of the wall. A first threaded end is defined by a first outer surface portion extending over a first axial length. A second threaded end is defined by a second inner surface portion extending over a second axial length. The sum of the first axial length and the second axial length is less than or equal to the total axial length of the connecting part.

8 Claims, 2 Drawing Sheets

(56) References Cited

U.S. PATENT DOCUMENTS

| | | | |
|---|---|---|---|
| 7,938,177 B1 * | 5/2011 | Wiggins | ................ E21B 17/042 |
| 2011/0227337 A1 | 9/2011 | Kattler et al. | |
| 2016/0376849 A1 | 12/2016 | Zimmerman | |

* cited by examiner

METAL TUBULAR CONNECTING PART AND METHOD FOR OBTAINING SUCH A PART BY ADDITIVE MANUFACTURING

BACKGROUND

The present invention relates to metal tubular components in the field of oil and gas, energy or storage, and in particular for use for example in the operation of hydrocarbon wells or hydrocarbon transportation, the geothermal field or carbon capture.

More specifically, the present invention relates to a metal tubular connecting part, for example made of steel, intended to connect at least two metal tubular components which are not compatible due to the fact that the inner and/or outer diameter, the thickness and the geometry of the threading to be connected are different. Such connecting parts (1) have a yield strength that is preferably greater than or equal to 550 MPa.

For the purposes of the present invention, a "connecting part" is understood to mean a coupling fitting, or connection, frequently referred to in the literature by one of the following terms: "cross-over", "circulating heads", "circulating swage" or "water bushing". The present invention further relates to a method for obtaining such a metal tubular connecting part by additive manufacturing.

In the prior art, such metal tubular connecting parts have two threaded ends, typically of different diameters, and a transition portion connecting the two threaded ends and allowing, where appropriate, a gradual change from one diameter to the other. These metal tubular connecting parts are obtained by subtractive manufacturing methods, in particular by various controlled machining and material removal processes (e.g. cutting or boring), from solid metal bars, blocks or thick tubes.

The drawback of the connecting parts of the prior art is that they are very heavy, which complicates the work carried out by operators who are required to handle these connecting parts, in particular during transport, handling and use. Moreover, the subtractive methods used for manufacturing the connecting parts of the prior art have several drawbacks. In particular, the greater the amount of material to be removed, the higher the manufacturing cost. As a result, with subtractive methods, manufacturers are forced to remove as little material as possible in order to optimise the cost of manufacturing a part. This economic restriction leads to a technical restriction, i.e. a minimum amount of material is removed, which results in the wall of the connecting parts of the prior art having a significant thickness in the transition portion. At this transition portion, more material could be removed, which would reduce the weight of the part and make it easier for operators to handle during transport, use and handling operations. Instead, in order to save on costs, the final part has a significant amount of excess material at the transition portion thereof, making it heavy and cumbersome.

Furthermore, this excess material also represents a loss of material that could be reused in the manufacture of other parts. This material loss thus ends up being an economic loss as well.

BRIEF SUMMARY

In order to overcome the drawbacks of the connecting parts of the prior art, the object of the present invention relates to a metal tubular connecting part having at least one axis of revolution (x) and a total axial length ($L_T$), said connecting part comprising:
- an inner surface and an outer surface, said inner and outer surfaces delimiting a wall,
- at least a first outer transition plane ($B_{ext}$) and at least a second outer transition plane ($D_{ext}$), both of said outer transition planes ($B_{ext}$) and ($D_{ext}$) being orthogonal to the axis of revolution (x),
- at least a first inner transition plane ($A_{int}$) and at least a second inner transition plane ($C_{int}$), both of said inner transition planes ($A_{int}$) and ($C_{int}$) being orthogonal to the axis of revolution (x),
- an outer transition surface ($ST_{ext}$) which has a frustoconical shape defined by an outer transition generatrix (G) having an inclination of angle α1 to the axis of revolution (x), said outer transition surface ($ST_{ext}$) extending from the first outer transition plane ($B_{ext}$) as far as the second outer transition plane ($D_{ext}$),
- an inner transition surface ($ST_{int}$) which has a frustoconical shape defined by an inner transition generatrix (G") having an inclination of angle α2 to the axis of revolution (x), said inner transition surface ($ST_{int}$) extending from the first inner transition plane ($A_{int}$) as far as the second inner transition plane ($C_{int}$),
- said outer transition surface ($ST_{ext}$) and inner transition surface ($ST_{int}$) delimiting a wall transition thickness (W),
- a first male or female threaded end, having a first end plane (S1) orthogonal to the axis of revolution (x), a first inner diameter ($ID_1$) and a first outer diameter ($OD_1$), said first end being defined by a first inner surface portion ($P1_{int}$) of inner diameter ($ID_1$) and extending from the first end plane (S1) as far as the first inner transition plane ($A_{int}$), and by a first outer surface portion ($P1_{ext}$) of outer diameter ($OD_1$) and extending over a first axial length ($L_1$) from the first end plane (S1) as far as the first outer transition plane ($B_{ext}$), said first inner surface portion ($P1_{int}$) having a substantially cylindrical shape defined by a first inner surface generatrix ($G1_{int}$), and said first outer surface portion ($P1_{ext}$) having a substantially cylindrical shape defined by a first outer surface generatrix ($G1_{ext}$),
- a second male or female threaded end, having a second end plane (S2) orthogonal to the axis of revolution (x), a second inner diameter ($ID_2$) and a second outer diameter ($OD_2$), said second end being defined by a second inner surface portion ($P2_{int}$) of inner diameter ($ID_2$) and extending over a second axial length ($L_2$) from the second end plane (S2) as far as the second inner transition plane ($C_{int}$), and by a second outer surface portion ($P2_{ext}$) of outer diameter ($OD_2$) and extending from the second end plane (S2) as far as the second outer transition plane ($D_{ext}$), said inner surface portion ($P2_{int}$) having a substantially cylindrical shape defined by a second inner surface generatrix ($G2_{int}$), said second outer surface portion ($P2_{ext}$) having a substantially cylindrical shape defined by a second outer surface generatrix ($G2_{ext}$), the sum of the first and second axial lengths ($L_1$) and ($L_2$) being less than or equal to the total axial length ($L_T$) of the connecting part,
- said connecting part being characterised in that the first end has a first wall thickness (E1), the second end has a second wall thickness (E2), and the transition thickness (W) satisfies the following equation:

$$1 \times \max(E1; E2) \leq W \leq 1.5 \times \max(E1; E2)$$

Where: max (E1; E2) represents the largest value selected from the thicknesses (E) and (E2), and corresponds to (E1) and to (E2) when (E1) and (E2) are equal. Thus, the wall thickness variations in the transition portion are low. In other words, the thickness of the wall in the transition portion is more homogeneous than in the connecting parts of the prior art.

In the present patent application, the term "threaded end" is understood to mean an end which has a thread along all or part of the length thereof. Furthermore, in the present patent application, the term "substantially cylindrical" refers to a tubular surface that can have surface irregularities, such as threads.

Furthermore, in the present patent application, the term "axial length" refers to any length along the axis of revolution (x). Thus, any element or any portion of the connecting part that has an axial length is an element or a portion having an axis that is substantially zero relative to the axis of revolution (x) of the connecting part.

Such a ratio between the first and second axial lengths ($L_1$) and ($L_2$) is due to the order in which the transition planes succeed one another along the axis of revolution (x), from the first end plane (S1) to the second end plane (S2). According to one embodiment, the planes ($B_{ext}$) and ($C_{int}$) can be aligned. In such a case, the sum of the axial lengths ($L_1$) and ($L_2$) is equal to the total axial length ($L_T$) of the connecting part. According to one embodiment wherein the planes ($B_{ext}$) and ($C_{int}$) are not aligned, the plane ($A_{int}$) is closer to the plane ($B_{ext}$) than to the plane ($C_{int}$) and the plane ($D_{ext}$) is closer to the plane ($C_{int}$) than to the plane ($B_{ext}$). In such a case, the sum of the axial lengths ($L_1$) and ($L_2$) is strictly less than the total axial length ($L_T$) of the connecting part. This arrangement of the transition planes leads to a refining of the wall portion located between the first inner surface transition plane ($A_{int}$) and the second outer surface transition plane ($D_{ext}$): this wall portion is referred to as the transition portion. This refinement results in a reduction of the thickness of the wall in the transition portion as well as in a reduction of the weight of the connecting part.

The first and second end planes (S1) and (S2) are the planes that delimit the total axial length ($L_T$) of the connecting part. In other words, the connecting part extends over a total axial length ($L_T$) from the first end plane (S1) as far as the second end plane (S2).

The first inner transition plane ($A_{int}$) is a cross-sectional plane of the connecting part. The plane ($A_{int}$) is orthogonal to the axis of revolution (x) and passes through the intersection between the first inner surface generatrix ($G1_{int}$) and the inner transition generatrix (G"). The first outer transition plane ($B_{ext}$) is a cross-sectional plane of the connecting part. The plane ($B_{ext}$) is orthogonal to the axis of revolution (x) and passes through the intersection between the first outer surface generatrix ($G1_{ext}$) and the outer transition generatrix (G). The second inner transition plane ($C_{int}$) is a cross-sectional plane of the connecting part. The plane ($C_{int}$) is orthogonal to the axis of revolution (x) and passes through the intersection between the second inner surface generatrix ($G2_{int}$) and the inner transition generatrix (G"). The second outer transition plane ($D_{ext}$) is a cross-sectional plane of the connecting part. The plane ($D_{ext}$) is orthogonal to the axis of revolution (x) and passes through the intersection between the second outer surface generatrix ($G2_{ext}$) and the outer transition generatrix (G). The transition thickness (W) corresponds to the thickness of the wall portion extending from the first outer transition plane ($B_{ext}$) as far as the second inner transition plane ($C_{int}$). In other words, the transition thickness (W) extends over the entire wall portion in which the outer transition surface ($ST_{ext}$) and inner transition surface ($ST_{int}$) are superimposed. The length over which the transition thickness (W) extends is thus delimited by the first outer transition plane ($B_{ext}$) and the second inner transition plane ($C_{int}$).

In the present patent application, the term "thickness", when referring to any portion of the wall, means a thickness measured along an axis perpendicular to at least one of the surfaces delimiting the wall in the portion being considered, i.e. one of the following surfaces: inner surface, outer surface, inner transition surface ($ST_{int}$) or outer transition surface ($ST_{ext}$). The two inner surface generatrices ($G1_{int}$) and ($G2_{int}$), and the two outer surface generatrices ($G1_{ext}$) and ($G2_{ext}$) all have a substantially zero angle relative to the axis of revolution (x). A "substantially zero angle" is understood here to mean an angle that is less than or equal to 2° to the axis of revolution (x).

According to one embodiment, the first outer diameter ($OD_1$) is different from the second outer diameter ($OD_2$).

According to one embodiment, the first inner diameter ($ID_1$) is different from the second inner diameter ($ID_2$).

According to one embodiment, the first outer diameter ($OD_1$) is different from the second outer diameter ($OD_2$), and the first inner diameter ($ID_1$) is different from the second inner diameter ($ID_2$).

According to one embodiment, the diameter ($OD_2$) can be equal to the diameter ($ID_1$).

According to one embodiment, the first and second outer diameters ($OD_1$) and ($OD_2$) are between 25 mm and 950 mm. Preferably, the greatest of the two outer diameters ($OD_1$) and ($OD_2$) is between 75 mm and 950 mm, and the smallest of the two outer diameters ($OD_1$) and ($OD_2$) is between 25 mm and 700 mm.

According to one embodiment, the first and second inner diameters ($ID_1$) and ($ID_2$) are between 20 mm and 900 mm. Preferably, the greatest of the two inner diameters ($ID_1$) and ($ID_2$) is between 70 mm and 900 mm, and the smallest of the two inner diameters ($ID_1$) and ($ID_2$) is between 20 mm and 695 mm.

Preferably, the difference between ($OD_1$) and ($OD_2$) is less than or equal to 500 mm and the difference between ($ID_1$) and ($ID_2$) is less than or equal to 500 mm.

The first inner diameter ($ID_1$) is measured in the vicinity of the first inner transition plane ($A_{int}$). The second inner diameter ($ID_2$) is measured in the vicinity of the second inner transition plane ($C_{int}$). The first outer diameter ($OD_1$) is measured in the vicinity of the first outer transition plane ($B_{ext}$). The second outer diameter ($OD_2$) is measured in the vicinity of the second inner transition plane ($D_{ext}$). The inner and outer diameters of the first and second ends can thus vary.

All of the aforementioned features contribute, either individually or together, to reducing the thickness of the wall in the wall portion located between the first inner transition plane ($A_{int}$) and the second outer transition plane ($D_{ext}$): this wall portion being referred to as the transition portion.

According to one embodiment, the first end has at least one first non-threaded part, and the second end has at least one second non-threaded part.

According to one embodiment, the first non-threaded part extends over a first non-threaded length ($l_1$) from the first inner transition plane ($A_{int}$), and the second non-threaded part extends over a second non-threaded length ($l_2$) from the second inner transition plane ($C_{int}$). The first and second non-threaded lengths ($l_1$) and ($l_2$) are axial lengths.

Advantageously, each of the first and second non-threaded lengths ($l_1$) and ($l_2$) is greater than or equal to 150 mm. Such a length of the non-threaded parts allows the connecting part to be seized or grasped by the tools commonly used by operators to assemble, for example by screwing, the connecting part to the at least two tubular components to be connected.

According to one embodiment, the inner surface comprises the following parts from the first end plane (S1) to the second end plane (S2):
- a first threaded or non-threaded part ($T1_{int}$),
- a first cylindrical non-threaded part,
- a frustoconical part ($ST_{int}$),
- a second cylindrical non-threaded part, and
- a second threaded or non-threaded part ($T2_{int}$).

According to one embodiment, the outer surface comprises the following parts from the first end plane (S1) to the second end plane (S2):
- a first threaded or non-threaded part ($T1_{ext}$),
- a third cylindrical non-threaded part,
- a frustoconical part ($ST_{ext}$),
- a fourth cylindrical non-threaded part, and
- a second threaded or non-threaded part ($T2_{ext}$).

According to one embodiment, the first and second thicknesses (E1) and (E2) are between 2 mm and 300 mm, more preferably between 2 mm and 150 mm, even more preferably between 2 mm and 75 mm.

According to one embodiment, the first and second thicknesses (E1) and (E2) are such that $|(E1)-(E2)| \leq 65$ mm, preferably such that $|(E1)-(E2)| \leq 40$ mm, even more preferably such that $|(E1)-(E_2)| \leq 25$ mm.

Preferably, the first and second thicknesses (E1) and (E2) are equal.

According to one embodiment, the angles $\alpha 1$ and $\alpha 2$ are both between 10° and 30° inclusive relative to the axis of revolution (x). This allows a fluid to flow optimally through the connecting part. Preferably the angles $\alpha 1$ and $\alpha 2$ are both between 15° and 25° inclusive, and more preferably $\alpha 1$ and $\alpha 2$ are both 20°. When the angles $\alpha 1$ and $\alpha 2$ are greater than 30°, a fluid can no longer flow optimally and the connecting part loses efficiency as regards the fluid-carrying function thereof. When the angles $\alpha 1$ and $\alpha 2$ are less than 10°, the total axial length ($L_T$) of the part is too great and no longer complies with the dimensional standards for this type of fitting. As the dimensional standards are established for optimal handling and storage of this type of product, it is thus preferable not to lengthen these fittings beyond the 10° incidence, i.e. such that the angles $\alpha 1$ and $\alpha 2$ are less than 10°.

According to one embodiment, the angles $\alpha 1$ and $\alpha 2$ are such that $|\alpha 1 - \alpha 2| \leq 5°$. Preferably the angles $\alpha 1$ and $\alpha 2$ are such that $|\alpha 1 - \alpha 2| \leq 2°$. More preferably, the angles $\alpha 1$ and $\alpha 2$ are such that $|\alpha 1 - \alpha 2| = 0°$ and thus the outer transition surface ($ST_{ext}$) and inner transition surface ($ST_{int}$) are substantially parallel to one another and the transition thickness (W) is substantially constant along the entire length thereof.

According to one embodiment, the transition thickness (W) is between 2 mm and 450 mm, preferably between 2 and 225 mm, more preferably between 3 mm and 75 mm, and even more preferably between 7 mm and 25 mm.

According to one embodiment, the total axial length ($L_T$) of a connecting part is between m and 6 m, preferably between 0.3 m and 2.5 m, more preferably between 0.6 m and 1.5 m.

The present invention further relates to a connecting part, whose wall is produced either wholly or partially by additive manufacturing. Preferably, the wall is produced entirely by additive manufacturing.

According to the standard ISO/ASTM52900:2015(E), the term "additive manufacturing" is the general term for those technologies that, based on a geometrical representation, create physical objects by successive addition of material. ISO/ASTM52900:2015(F) defines the term "additive manufacturing" as follows: the process of joining materials to make parts from 3D model data, usually layer upon layer, as opposed to subtractive manufacturing and formative manufacturing methodologies.

The inventors have found that the invention allows a homogeneous heat treatment to be carried out on the connecting part, in particular in the transition portion due to the homogeneity of the thickness of the wall. This is not the case in the prior art because the inhomogeneity of the thickness of the wall in the transition portion is such that the effects of a heat treatment on the connecting part will inevitably have inhomogeneities within the transition portion.

Surprisingly, the inventors have also found that, due to the homogeneity of the thickness of the wall in the transition portion, non-destructive ultrasonic testing can also be carried out on the connecting part of the invention. Non-destructive ultrasonic testing aims to detect defects in the wall of a part based on the emission of signals in the form of ultrasounds and the detection of their reflection linked to the acoustic interfaces they encounter in the thickness of the wall. More specifically, the dimensions, shape and location of a defect are determined as a function of the time that elapses between the emission of an ultrasonic signal at a specific location on the wall of the part, and the detection of its reflection at another specific location on the wall. Thus, when the wall has large differences in thickness between the place where the signal was emitted and the place where the reflection of this signal was detected, said signal can originate from such a variety of trajectories of the emitted ultrasounds that it is difficult to isolate from the other signals. Thus, the signal to be detected cannot be used to evaluate the defect to be identified. Such measurements are thus unreliable when the wall of a connecting part has significant differences in thickness, so much so that some areas cannot be inspected, in particular in the transition portion, due to the presence of returned signals from ultrasonic paths related to the geometry of the part in the transition portion, in particular related to the thickness of the wall and to the angles of inclination of the inner and outer transition surfaces. Thus, in the prior art, non-destructive ultrasonic testing cannot be carried out on the connecting part. It is thus only carried out on the metal block before it is subjected to conventional subtractive methods and the final part is never ultrasonically tested, thus leaving potential defects in the wall of the part after manufacture.

A further object of the invention relates to a method for obtaining a connecting part which comprises at least:
  i. a step of producing the wall wholly or partially by additive manufacturing,
  ii. a step of machining the first and second ends.

Such a method makes it possible to dispense with subtractive methods at least for obtaining the wall. The wall thus constitutes a preform which is then threaded in the machining step (ii) by methods of the prior art. Such a method makes it possible to limit the amount of material required to obtain the wall, thus avoiding the waste of material usually generated by subtractive methods.

According to the invention, step (i) can be carried out by one of the following additive manufacturing methods belonging to the "Direct Energy Deposition" category defined by the standard ASTM F2792, such as "Laser Metal Deposition" (LMD), "Wire Arc Additive Manufacturing" (WAAM), or any other method that can be qualified as a "Direct Energy Deposition" method.

According to one embodiment, the method comprises a third step (iii) of heat treating the connecting part.

According to one embodiment, the machining step (ii) comprises machining all of the surfaces of the part and can be carried out before or after the heat treatment step.

BRIEF DESCRIPTION OF THE DRAWINGS

Other features and advantages of the invention will become apparent upon examining the detailed description provided hereinbelow, and from the accompanying drawings.

The accompanying drawings can be used not only to complement the invention, but also to contribute to the definition thereof, where appropriate. They are not limiting as to the scope of the invention.

DETAILED DESCRIPTION

Figure 1:
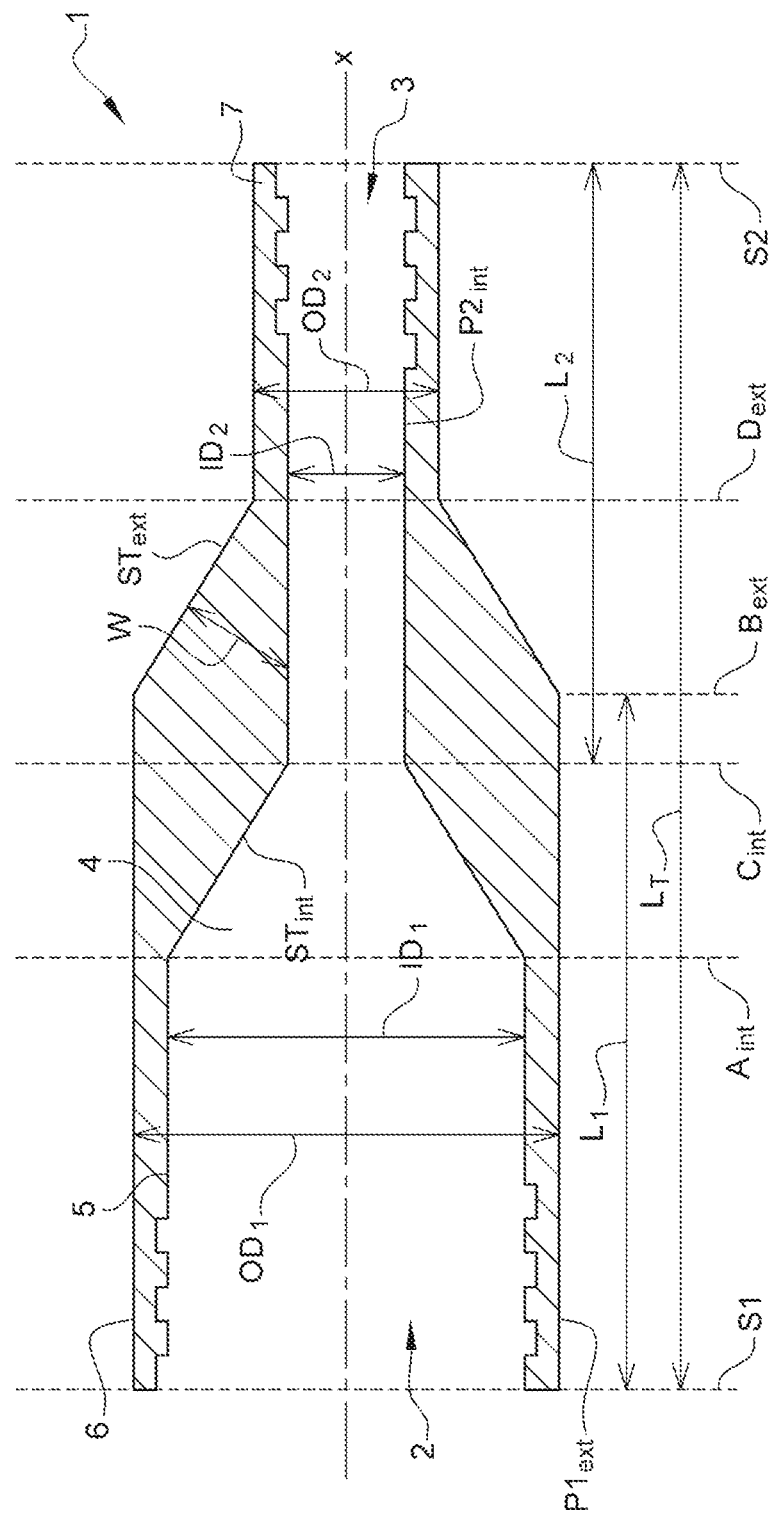
FIG. 1 shows a diagram of a longitudinal sectional view of a connecting part of the prior art.

FIG. 1 shows a diagram of a longitudinal sectional view of a connecting part (1) of the prior art. The connecting part comprises an axis of revolution (x), a total axial length ($L_T$), a wall (7), an inner surface (5) and an outer surface (6), a first threaded end (2) and a second threaded end (3), as well as a transition portion (4).

The transition portion (4) extends from a first inner transition plane ($A_{int}$) as far as a second outer transition plane ($D_{ext}$).

The first end (2) is defined by a first end plane (S1) and a first outer surface portion ($P1_{ext}$) which extends over a first axial length ($L_1$) from the first end plane (S1) as far as a first outer transition plane ($D_{est}$).

The second end (3) is defined by a second end plane (S2) and a second inner surface portion ($P2_{int}$) which extends over a second axial length ($L_2$) from the second end plane (S2) as far as a second inner transition plane ($C_{int}$).

The second inner transition plane ($C_{int}$) passes orthogonally through the first outer surface portion ($P1_{ext}$). In other words, the first outer surface portion ($P1_{ext}$) and the second inner surface portion ($P2_{int}$) are superimposed in the part delimited by the second inner transition plane ($C_{int}$) and the first outer transition plane ($B_{est}$). Thus, the first axial length ($L_1$) and the second axial length ($L_2$) are such that the sum thereof is greater than the total axial length ($L_T$) of the connecting part (1). This results in an excess of material and a significant thickness of the wall (7) in the transition portion (4), in particular in the part defined between the second inner transition plane ($C_{int}$) and the first outer transition plane ($B_{ext}$) wherein the portions ($P1_{ext}$) and ($P2_{int}$) are superimposed.

In order to obtain a smaller and more homogeneous wall thickness in the transition portion of the connecting part, the geometries of the connecting parts of the prior art are insufficient, as an excess of material is always present in the transition portion.

Figure 2:
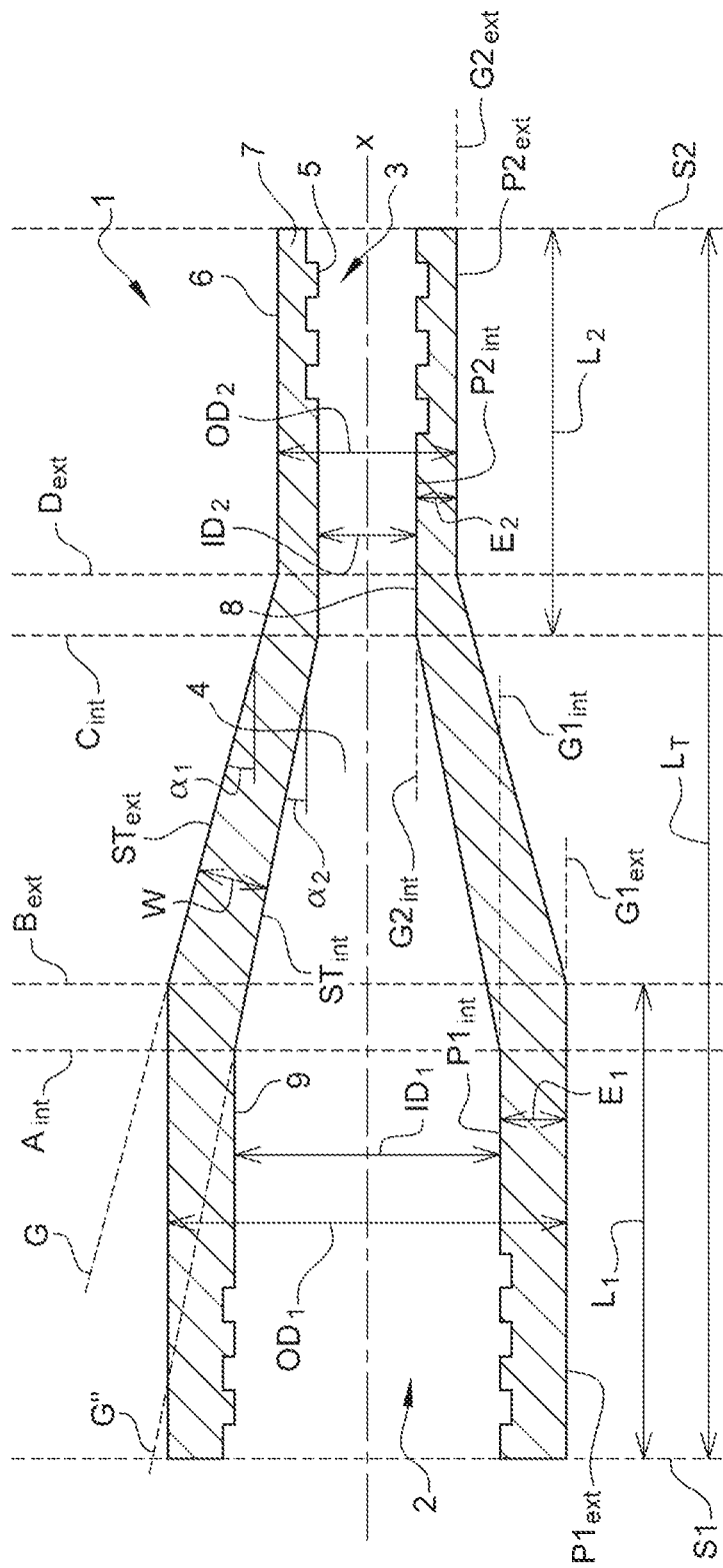
FIG. 2 shows a diagram of a longitudinal sectional view of a connecting part according to one embodiment of the invention.

FIG. 2 diagrammatically shows a longitudinal sectional view of a connecting part (1) according to one embodiment of the invention. The connecting part (1) comprises a first threaded end (2), a second threaded end (3) and a transition portion (4) that connects the ends (2) and (3). Moreover, the part (1) comprises a wall (7) delimited by an inner surface (5) and an outer surface (6).

The wall (7) includes several portions which can be delimited by end planes and/or transition planes. More specifically, the connecting part (1) shown in FIG. 2 includes a first end plane (S1) and a second end plane (S2), a first inner transition plane ($A_{int}$) and a second inner transition plane ($C_{int}$), a first outer transition plane ($B_{ext}$) and a second outer transition plane ($D_{ext}$).

The first end (2) has a first inner diameter ($ID_1$) and a first outer diameter ($OD_1$). The first end (2) extends from the first end plane (S1) as far as the first outer transition plane ($B_{ext}$).

The representation of the threading in the figures is diagrammatic. Typically, the threads of the two ends have inclined faces.

The first end (2) comprises a first outer surface portion ($P1_{ext}$) which extends over a first axial length ($L_1$). The first axial length ($L_1$) is greater than an axial length over which extends a first inner surface portion ($P1_{int}$).

The first end (2) further has a first non-threaded part (9) which extends over a first non-threaded length ($l_1$). The wall (7) of the first end (2) has a first thickness (E1) that is substantially constant over the entire first non-threaded length ($l_1$). In other words, the first thickness (E1) is substantially constant over the entire portion of wall (7) in which the first inner surface portion ($P1_{int}$) and the first outer surface portion ($P1_{ext}$) are superimposed.

The first non-threaded part (9) occupies a position that is proximal to the transition portion (4). In the threaded part of the first end (2), the first thickness (E1) varies according to the dimensioning and geometry of the threads. FIG. 2 shows one embodiment wherein the first end (2) has a female threading, i.e. the inner surface (5) is threaded and the outer surface (6) is not threaded. However, according to the invention, the threading can be present either on the inner surface (5) or on the outer surface (6) of the first end (2). The threaded part of the first end (2) occupies a position that is distal to the transition portion (4).

The second end (3) has a second inner diameter ($ID_2$) and a second outer diameter ($OD_2$). The second inner diameter ($ID_2$) is less than the first inner diameter ($ID_1$) and the second outer diameter ($OD_2$) is less than the first outer diameter ($OD_1$). The second end (3) extends from the second end plane (S2) as far as the second inner transition plane ($C_{int}$).

The second end (3) comprises a second inner surface portion ($P2_{int}$) which extends over a second axial length ($L_2$). The second axial length ($L_2$) is greater than an axial length over which extends the second outer surface portion ($P2_{ext}$).

The second end (3) further has a second non-threaded part (8) which extends over a second non-threaded length ($l_2$). The wall (7) of the second end (3) has a second thickness (E2) that is substantially constant over the entire second non-threaded length ($l_2$). In other words, the second thickness ($E_2$) is substantially constant over the entire portion of wall (7) in which the second inner surface portion ($P2_{int}$) and the second outer surface portion ($P2_{ext}$) are superimposed.

The second non-threaded part (8) occupies a position that is proximal to the transition portion (4). In the threaded part of the second end (3), the second thickness (E2) varies according to the dimensioning and geometry of the threads.

FIG. 2 shows one embodiment wherein the second end (3) has a female threading, i.e. the inner surface (5) is threaded and the outer surface (6) is not threaded. However, according to the invention, the threading can be present either on the inner surface (5) or on the outer surface (6) of the second end (3). The threaded part of the second end (3) occupies a position that is distal to the transition portion (4).

The first and second ends (2) and (3) are shown in FIG. 2 as both having a female threading, however the present invention also encompasses the case where both ends (2) and (3) have a male threading, as well as the case where one of the two ends (2) and (3) has a female threading and the other a male threading.

The transition portion (4) extends from the first inner transition plane ($A_{int}$) to the second outer transition plane ($D_{ext}$). The connecting part (1) thus comprises two wall portions in which the ends (2) and (3) are aligned with the transition portion (4). These two portions are referred to as connection areas. Each of the connection areas is defined by an inner connection radius and an outer connection radius (not shown in the figures) which gives the connection areas a rounded shape. The radius of curvature of this rounded shape, i.e. the connection radius, can be between 20 mm and 80 mm inclusive, preferably between 25 and 65 mm inclusive. More preferably, the connection radii measure 50 mm. The connection radii must comply with these dimensions in order to limit the concentration of stresses, or forces, that are applied to the transition portion (4) when the connecting part (1) is under operating conditions. If not properly dimensioned, these stresses can exceed the yield strength of the connecting part (1).

The first connection area is delimited by the first inner transition plane ($A_{int}$) and the first outer transition plane ($B_{ext}$), and the second connection area is delimited by the second inner transition plane ($C_{int}$) and the second outer transition plane ($D_{ext}$). The first and second connection areas allow the first and second ends (2) and (3) to be gradually connected to the transition portion (4).

In the connection areas, only one of the inner and outer diameters of the part (1) varies, and the other does not. Thus, in the first connection area, only the inner diameter ($ID_1$) varies according to a slope with an inclination of angle $\alpha 1$ to the axis (x). In the second connection area, only the second outer diameter ($OD_2$) varies according to a slope with an inclination of angle $\alpha 2$ to the axis (x).

The portion of wall (7) with the transition thickness (W) is located between the two connection areas. More specifically, the portion of wall (7) with the transition thickness (W) extends from the first outer transition plane ($B_{ext}$) to the second inner transition plane ($C_{int}$). In this portion of wall (7), the inner surface (5) and outer surface (6) are respectively referred to as the outer transition surface ($ST_{ext}$) and inner transition surface ($ST_{int}$). In contrast to the connection areas, in this portion of wall (7) with the transition thickness (W), the inner and outer diameters both vary. The inner diameter varies according to a slope with an inclination of angle $\alpha 2$ to the axis (x). The outer diameter varies according to a slope with an inclination of angle $\alpha 1$ to the axis (x). The angles $\alpha 1$ and $\alpha 2$ both have a value between 10° and 30° inclusive such that: $10° \leq \alpha 1 \leq 30°$ and $10° \leq \alpha 2 \leq 30°$. The difference in inclination between the inner transition surface ($ST_{int}$) and outer transition surface ($ST_{ext}$) does not exceed 5 degrees inclusive, and preferably does not exceed 2 degrees inclusive, such that: $|\alpha 1 - \alpha 2| \leq 5°$, preferably $|\alpha 1 - \alpha 2| \leq 2°$.

The invention claimed is:

1. A metal tubular connecting part having at least an axis of revolution and a total axial length, said connecting part comprising:
    an inner surface and an outer surface, said inner surface and outer surface delimiting a wall,
    at least a first outer transition plane and at least a second outer transition plane, both of said outer transition planes being orthogonal to the axis of revolution,
    at least a first inner transition plane and at least a second inner transition plane, both of said inner transition planes being orthogonal to the axis of revolution,
    an outer transition surface which has a frustoconical shape defined by an outer transition generatrix having an inclination of angle $\alpha 1$ to the axis of revolution, said outer transition surface extending from the first outer transition plane as far as the second outer transition plane,
    an inner transition surface which has a frustoconical shape defined by an inner transition generatrix having an inclination of angle $\alpha 2$ to the axis of revolution, said inner transition surface extending from the first inner transition plane as far as the second inner transition plane, said outer transition surface and inner transition surface delimiting a transition thickness of the wall,
    a first male or female threaded end, having a first end plane orthogonal to the axis of revolution, a first inner diameter and a first outer diameter, said first end being defined by a first inner surface portion having an inner diameter and extending from the first end plane as far as the first inner transition plane, and by a first outer surface portion having an outer diameter and extending over a first axial length from the first end plane as far as the first outer transition plane, said first inner surface portion having a substantially cylindrical shape defined by a first inner surface generatrix, and said first outer surface portion having a substantially cylindrical shape defined by a first outer surface generatrix,
    a second male or female threaded end, having a second end plane orthogonal to the axis of revolution, a second inner diameter, and a second outer diameter, said second end being defined by a second inner surface portion having an inner diameter and extending over a second axial length from the second end plane as far as the second inner transition plane, and by a second outer surface portion having an outer diameter and extending from the second end plane as far as the second outer transition plane, said inner surface portion having a substantially cylindrical shape defined by a second inner surface generatrix, said second outer surface portion having a substantially cylindrical shape defined by a second outer surface generatrix,
    wherein a sum of the first and second axial lengths is less than or equal to the total axial length of the connecting part, and
    wherein the first end has a first thickness of the wall, the second end has a second thickness of the wall, and the transition thickness satisfies the following equation:

$$[\text{Math}1] \times \max(E1; E2) \leq W \leq 1.5 \times \max(E1; E2)$$

where: max (E1; E2) represents the largest value selected from the first thickness and the second thickness, and corresponds to the first thickness and to the second thickness when the first thickness and the second thickness are equal, and W represents the transition thickness.

2. The connecting part according to claim 1, wherein the first end has at least one first non-threaded part, and the second end has at least one second non-threaded part.

3. The connecting part according to claim 2, wherein the first non-threaded part extends over a first non-threaded length from the first inner transition plane, and the second non-threaded part extends over a second non-threaded length from the second inner transition plane.

4. The connecting part according to claim 1, wherein the angles $\alpha 1$ and $\alpha 2$ are both between 10° and 30° inclusive relative to the axis of revolution.

5. The connecting part according to claim 1, wherein the angles $\alpha 1$ and $\alpha 2$ are such that $|\alpha 1 - \alpha 2| \leq 5°$.

6. The connecting part according to claim 1, wherein the angles $\alpha 1$ and $\alpha 2$ are such that $|\alpha 1 - \alpha 2| \leq 2°$.

7. The connecting part according to claim 1, wherein the wall is produced wholly or partially by additive manufacturing.

8. A method for obtaining the connecting part according to claim 1, said method comprising:
   producing the wall wholly or partially by additive manufacturing, and
   machining the first and second ends.

\* \* \* \* \*